United States Patent
Mugunda et al.

(10) Patent No.: US 11,422,965 B1
(45) Date of Patent: Aug. 23, 2022

(54) HOT-SWAP CONTROLLER MONITORING CONFIGURATION SYSTEM

(71) Applicant: Dell Products L.P., Round Rock, TX (US)

(72) Inventors: Chandrasekhar Mugunda, Austin, TX (US); Rui An, Austin, TX (US); Akshata Sheshagiri Naik, Leander, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/350,196

(22) Filed: Jun. 17, 2021

(51) Int. Cl.
*G06F 13/40* (2006.01)
*G06F 9/4401* (2018.01)

(52) U.S. Cl.
CPC ........ *G06F 13/4081* (2013.01); *G06F 9/4411* (2013.01); *G06F 2213/0016* (2013.01)

(58) Field of Classification Search
None
See application file for complete search history.

(56) References Cited

U.S. PATENT DOCUMENTS

| 7,254,004 B2 | 8/2007 | Mladenik et al. |
| 11,132,322 B2 * | 9/2021 | Delany ................. H02H 3/087 |
| 2004/0225801 A1 * | 11/2004 | Scordalakes ........ G06F 13/4081 |
| | | 710/302 |

* cited by examiner

*Primary Examiner* — Idriss N Alrobaye
*Assistant Examiner* — Dayton Lewis-Taylor
(74) *Attorney, Agent, or Firm* — Joseph Mencher

(57) ABSTRACT

A computing system includes a component, a hot-swap controller that is coupled to the component, and a hot-swap controller monitoring configuration subsystem that is coupled to the hot-swap controller. The hot-swap controller monitoring subsystem receives a hot-swap controller monitoring configuration for the hot-swap controller that defines at least one monitoring characteristic for monitoring the component, uses it during an initialization of the computing system to generate hot-swap controller monitoring configuration commands, and transmits the hot-swap controller monitoring configuration commands to the hot-swap controller to configure the hot-swap controller to monitor the component according to at least one monitoring characteristic defined by the hot-swap controller monitoring configuration. During a runtime of the computing system following the initialization of the computing system, the hot-swap controller monitoring subsystem retrieves hot-swap controller monitoring data generated by the hot-swap controller for the component according to at least one monitoring characteristic.

20 Claims, 14 Drawing Sheets

| BITS | BIT NAME | DESCRIPTION | RESET | ACCESS |
|---|---|---|---|---|
| 15 | FET_HEALTH_FAULT_EN1 | FET HEALTH FAULT ENABLE. | 0x0 | RW |
| 14 | IOUT_OC_FAULT_EN1 | IOUT OVERCURRENT FAULT ENABLE. | 0x0 | RW |
| 13 | VIN_OV_FAULT_EN1 | VIN OVERVOLTAGE FAULT ENABLE. | 0x0 | RW |
| 12 | VIN_UV_FAULT_EN1 | VIN UNDERVOLTAGE FAULT ENABLE. | 0x0 | RW |
| 11 | CML_ERROR_EN1 | COMMUNICATIONS ERROR ENABLE. | 0x0 | RW |
| 10 | IOUT_OC_WARN_EN1 | IOUT OVERCURRENT WARNING ENABLE. | 0x0 | RW |
| 9 | HYSTERETIC_EN1 | HYSTERETIC OUTPUT ENABLE. | 0x0 | RW |
| 8 | VIN_OV_WARN_EN1 | VIN OVERVOLTAGE WARNING ENABLE. | 0x0 | RW |
| 7 | VIN_UV_WARN_EN1 | VIN UNDERVOLTAGE WARNING ENABLE. | 0x0 | RW |
| 6 | VOUT_OV_WARN_EN1 | VOUT OVERVOLTAGE WARNING ENABLE. | 0x0 | RW |
| 5 | VOUT_UV_WARN_EN1 | VOUT UNDERVOLTAGE WARNING ENABLE. | 0x0 | RW |
| 4 | HS_INLIM_EN1 | HOT SWAP IN-LIMIT ENABLE. | 0x0 | RW |
| 3 | PIN_OP_WARN_EN1 | PIN OVERPOWER WARNING ENABLE. | 0x0 | RW |
| 2 | OT_FAULT_EN1 | OVERTEMPERATURE FAULT ENABLE. | 0x0 | RW |
| 1 | OT_WARN_EN1 | OVERTEMPERATURE WARNING ENABLE. | 0x0 | RW |
| 0 | RESERVED | ALWAYS READS AS 0. | 0x0 | RESERVED |

FIG. 3A

| BITS | BIT NAME | SETTINGS | DESCRIPTION | RESET | ACCESS |
|---|---|---|---|---|---|
| 15 | TSFILT | | TEMPERATURE SENSOR FILTER ENABLE. | 0x0 | RW |
| | | 0 | DISABLED. | | |
| | | 1 | ENABLED. DATA SHEET SPECIFICATIONS ARE WITH THE TEMPERATURE SENSOR FILTER DISABLED. | | |
| 14 | SIMULTANE OUS | | SIMULTANEOUS SAMPLING. | 0x0 | RW |
| | | 0 | DISABLED. | | |
| | | 1 | ENABLED. POWER MONITORING ACCURACY IS REDUCED. DATA SHEET SPECIFICATIONS ARE WITH SIMULTANEOUS SAMPLING DISABLED. | | |
| [13:11] | PWR_AVG | | PIN AVERAGING. | 0x0 | RW |
| | | 000 | DISABLES SAMPLE AVERAGING FOR POWER. | | |
| | | 001 | SETS SAMPLE AVERAGING FOR POWER TO TWO SAMPLES. | | |
| | | 010 | SETS SAMPLE AVERAGING FOR POWER TO FOUR SAMPLES. | | |
| | | 011 | SETS SAMPLE AVERAGING FOR POWER TO EIGHT SAMPLES. | | |
| | | 100 | SETS SAMPLE AVERAGING FOR POWER TO 16 SAMPLES. | | |
| | | 101 | SETS SAMPLE AVERAGING FOR POWER TO 32 SAMPLES. | | |
| | | 110 | SETS SAMPLE AVERAGING FOR POWER TO 64 SAMPLES. | | |
| | | 111 | SETS SAMPLE AVERAGING FOR POWER TO 128 SAMPLES. | | |

FIG. 3B

| BITS | BIT NAME | SETTINGS | DESCRIPTION | RESET | ACCESS |
|---|---|---|---|---|---|
| [10:8] | VI_AVG | | VIN/VOUT/IOUT AVERAGING. | 0x7 | RW |
| | | 000 | DISABLES SAMPLE AVERAGING FOR CURRENT AND VOLTAGE. | | |
| | | 001 | SETS SAMPLE AVERAGING FOR CURRENT AND VOLTAGE TO TWO SAMPLES. | | |
| | | 010 | SETS SAMPLE AVERAGING FOR CURRENT AND VOLTAGE TO FOUR SAMPLES. | | |
| | | 011 | SETS SAMPLE AVERAGING FOR CURRENT AND VOLTAGE TO EIGHT SAMPLES. | | |
| | | 100 | SETS SAMPLE AVERAGING FOR CURRENT AND VOLTAGE TO 16 SAMPLES. | | |
| | | 101 | SETS SAMPLE AVERAGING FOR CURRENT AND VOLTAGE TO 32 SAMPLES. | | |
| | | 110 | SETS SAMPLE AVERAGING FOR CURRENT AND VOLTAGE TO 64 SAMPLES. | | |
| | | 111 | SETS SAMPLE AVERAGING FOR CURRENT AND VOLTAGE TO 128 SAMPLES. | | |
| [7:5] | RESERVED | | ALWAYS READS AS 000. | 0x0 | RESERVED |
| 4 | PMON_MODE | | CONVERSION MODE. | 0x1 | RW |
| | | 0 | SINGLE SHOT SAMPLING. | | |
| | | 1 | CONTINUOUS SAMPLING. | | |

FIG. 3C

| BITS | BIT NAME | SETTINGS | DESCRIPTION | RESET | ACCESS |
|---|---|---|---|---|---|
| 3 | TEMP1_EN |  | ENABLE TEMPERATURE SAMPLING. | 0x0 | RW |
|  |  | 0 | TEMPERATURE SAMPLING DISABLED. |  |  |
|  |  | 1 | TEMPERATURE SAMPLING ENABLED. |  |  |
| 2 | VIN_EN |  | ENABLE VIN SAMPLING. | 0x1 | RW |
|  |  | 0 | VIN SAMPLING DISABLED. |  |  |
|  |  | 1 | VIN SAMPLING ENABLED. |  |  |
| 1 | VOUT_EN |  | ENABLE VOUT SAMPLING. | 0x0 | RW |
|  |  | 0 | VOUT SAMPLING DISABLED. |  |  |
|  |  | 1 | VOUT SAMPLING ENABLED. |  |  |
| 0 | RESERVED |  | ALWAYS READS AS 0. | 0x0 | RESERVED |

FIG. 3D

HOT-SWAP CONTROLLER MONITORING CONFIGURATION SYSTEM

BACKGROUND

The present disclosure relates generally to information handling systems, and more particularly to configuring monitoring by hot-swap controllers in information handling systems.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, server systems like the DELL EMC® POWEREDGE XE8545 available from DELL® EMC® of Hopkinton, Mass., United States and Round Rock, Tex., United States, would benefit from the implementation of hot-swap controllers to monitor, report, and protect the server system from faults with server components (e.g., Field Effect Transistor (FET) health issues, over-current conditions, over-voltage conditions, under-voltage conditions, over-temperature conditions, etc.) that could otherwise draw large currents that may lead to server system damage, power losses, and/or other fault issues known in the art. Some of the inventors of the present disclosure have described systems and methods for monitoring such hot-swap controllers and reporting faults detected by those hot-swap controllers in U.S. patent application Ser. No. 17/347,200, filed on Jun. 14, 2021, the disclosure of which is incorporated by reference herein in its entirety. However, while hot-swap controllers also have the capability to monitor and report relatively granular fault conditions and/or events, conventional server systems would require their hot-swap controllers to be hard-coded by the server system provider to monitor for faults that are relevant to the largest subset of their customers, as they do not provide any ability for an administrator or other user of the server system to configure hot-swap controllers to perform granular fault condition event monitoring/reporting on components/component faults that are of the highest concern to them.

Accordingly, it would be desirable to provide a hot-swap controller monitoring configuration system that addresses the issues discussed above.

SUMMARY

According to one embodiment, an Information Handling System (IHS) includes a processing system; and a memory system that is coupled to the processing system and that includes instructions that, when executed by the processing system, cause the processing system to provide a hot-swap controller monitoring engine that is configured to: receive a hot-swap controller monitoring configuration for a hot-swap controller that defines at least one monitoring characteristic for monitoring a component that is coupled to the hot-swap controller; generate, using the host-swap controller monitoring configuration and during initialization operations for a computing system that includes the hot-swap controller and the component, hot-swap controller monitoring configuration commands; transmit the hot-swap controller monitoring configuration commands to the hot-swap controller to configure the hot-swap controller to monitor the component according to at least one monitoring characteristic defined by the hot-swap controller monitoring configuration; and retrieve, during a runtime of the computing system following the initialization of the computing system, hot-swap controller monitoring data generated by the hot-swap controller for the component according to at least one monitoring characteristic.

BRIEF DESCRIPTION OF THE DRAWINGS

FIG. 3A is a schematic view illustrating an embodiment of hot-swap controller monitoring configuration data that may be utilized in the hot-swap controller monitoring configuration system of the present disclosure.

FIG. 3B is a schematic view illustrating an embodiment of hot-swap controller monitoring configuration data that may be utilized in the hot-swap controller monitoring configuration system of the present disclosure.

FIG. 3C is a schematic view illustrating an embodiment of hot-swap controller monitoring configuration data that may be utilized in the hot-swap controller monitoring configuration system of the present disclosure.

FIG. 3D is a schematic view illustrating an embodiment of hot-swap controller monitoring configuration data that may be utilized in the hot-swap controller monitoring configuration system of the present disclosure.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
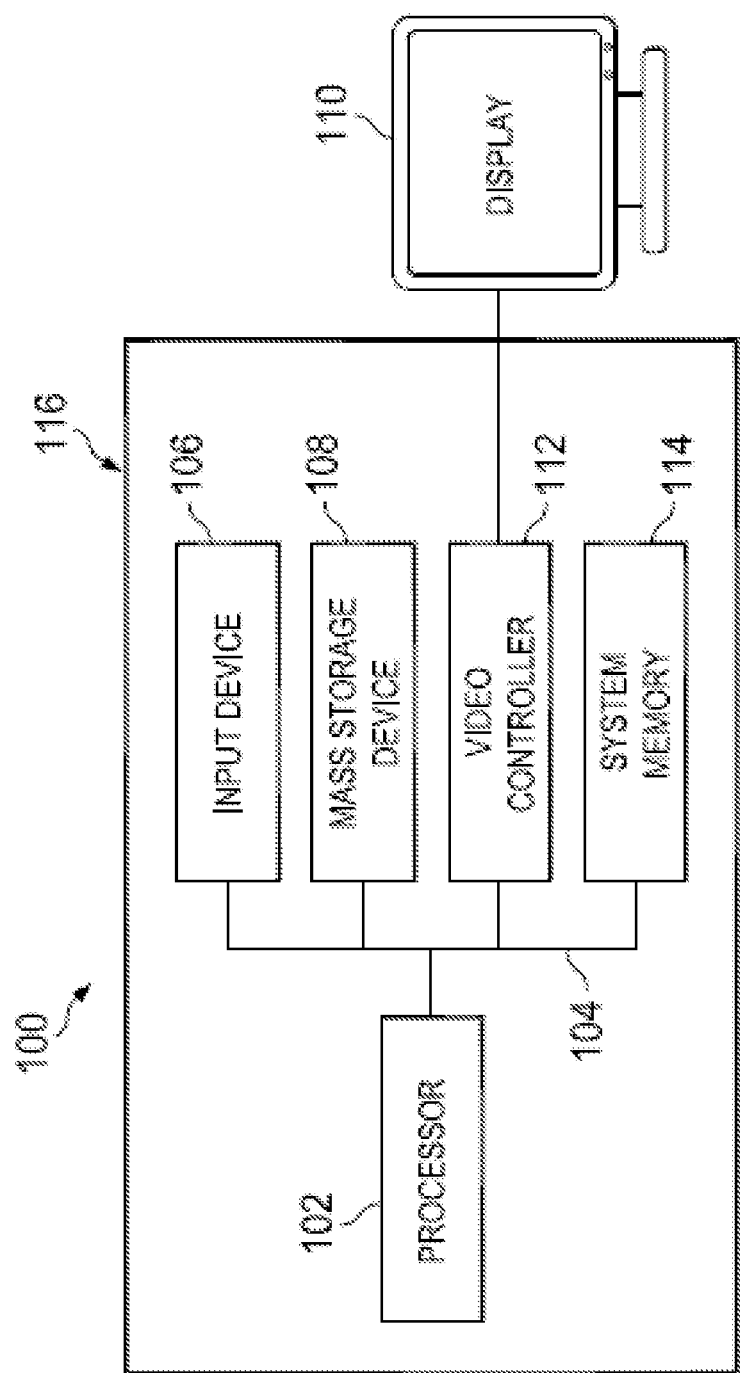
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety of other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
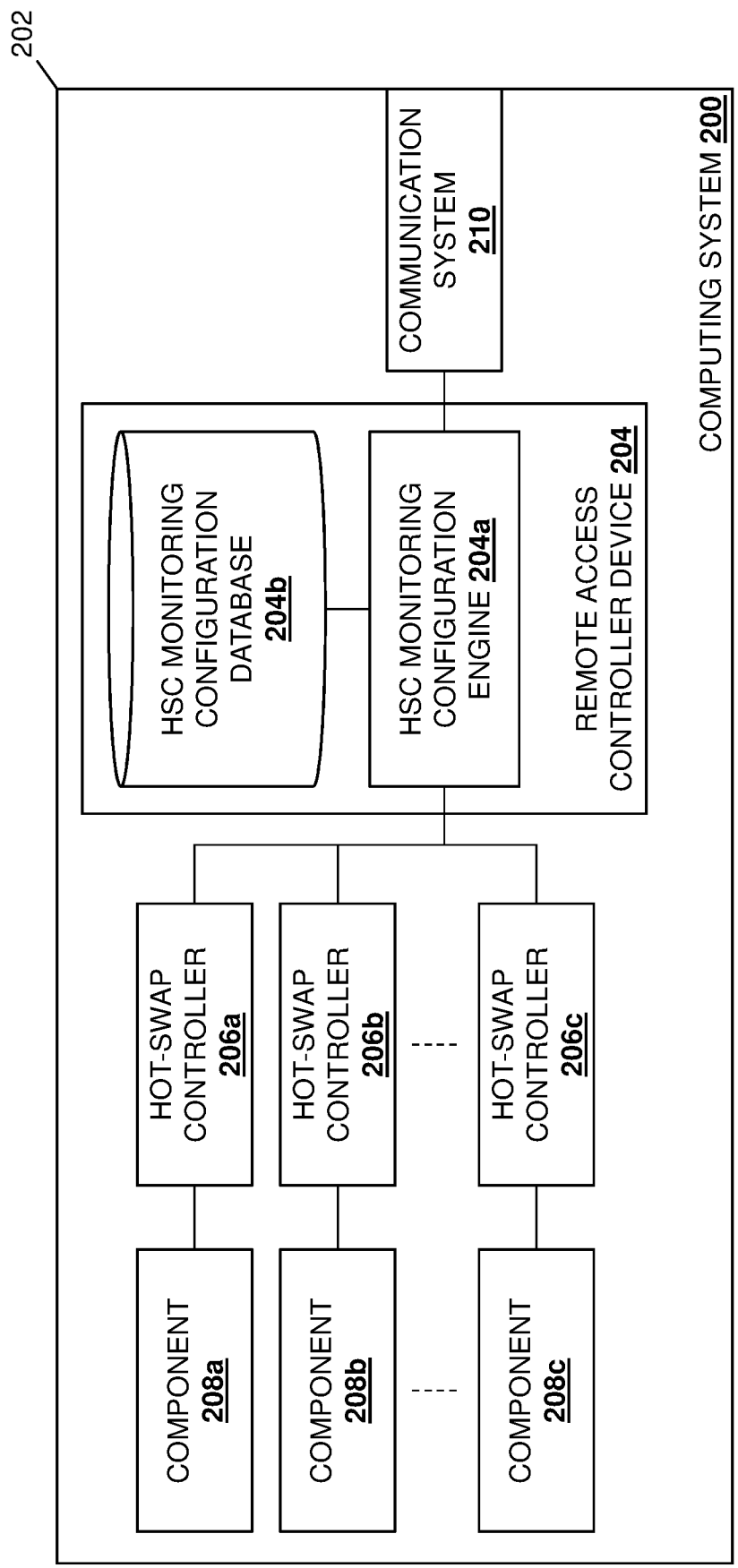
FIG. 2 is a schematic view illustrating an embodiment of a computing system that may include the hot-swap controller monitoring configuration system of the present disclosure.

Referring now to FIG. 2, an embodiment of a computing system 200 is illustrated that may include the hot-swap controller monitoring configuration system of the present disclosure. In an embodiment, the computing system 200 may be provided by the IHS 100 discussed above with reference to FIG. 1 and/or may include some or all of the components of the IHS 100, and in specific examples may be provided by a server system such as the DELL EMC® POWEREDGE XE8545 available from DELL® EMC® of Hopkinton, Mass., United States and Round Rock, Tex., United States. However, while illustrated and discussed as being provided by a particular server system, one of skill in the art in possession of the present disclosure will recognize that the functionality of the computing system 200 discussed below may be provided by other devices that are configured to operate similarly as the computing system 200 discussed below. In the illustrated embodiment, the computing system 200 includes a chassis 202 that houses the components of the computing system 200, only some of which are illustrated below.

For example, the chassis 202 may house a remote access controller device 204 such as, for example, the integrated DELL® Remote Access Controller (iDRAC) available in server systems from DELL EMC® discussed above, as well as other Baseboard Management Controllers (BMCs) and remote access controller devices that would be apparent to one of skill in the art in possession of the present disclosure. In the illustrated embodiment, the remote access controller device 204 may include a remote access controller processing system (not illustrated, but which may include the processor 102 discussed above with reference to FIG. 1) and a remote access controller memory system (not illustrated, but which may include the memory 114 discussed above with reference to FIG. 1) that is coupled to the remote access controller processing system and that includes instructions that, when executed by the remote access controller processing system, cause the remote access controller processing system to provide a hot-swap controller monitoring configuration engine 204a that is configured to perform the functionality of the hot-swap controller monitoring configuration engines and/or remote access controller devices discussed below.

The remote access controller device 204 may also include a remote access controller storage system (not illustrated, but which may include the storage 108 discussed above with reference to FIG. 1, and which may provide for the persistent storage discussed in some of the examples provided below) that is included in (or coupled to) the remote access controller device 204, that is coupled to the hot-swap controller monitoring configuration engine 204a (e.g., via a coupling between the remote access controller storage system and the remote access controller processing system), and that includes a hot-swap controller monitoring configuration database 204b that is configured to store any of the information utilized by the hot-swap controller monitoring configuration engine 204a discussed below. However, while the specific examples below provide a hot-swap controller monitoring configuration subsystem (e.g., the hot-swap controller monitoring configuration engine 204a in this example) in a remote access controller device/BMC, one of skill in the art in possession of the present disclosure will appreciate how the hot-swap controller monitoring configuration subsystem of the present disclosure may be provided by other devices while remaining within the scope of the present disclosure as well.

In the illustrated embodiment, the chassis 202 also houses a plurality of hot-swap controllers 206a, 206b, and up to 206c, each of which is coupled to the hot-swap controller monitoring configuration engine 204a in the remote access controller device 204 (e.g., via a coupling between that hot-swap controller and the remote access controller processing system). Furthermore, each of the hot-swap controllers 206a, 206b, and up to 206c is coupled to a respective component 208a, 208b, and up to 208c. As discussed above, each of the hot-swap controllers 206a-206c may be configured to monitor, report, and protect the computing system 200 from faults with components (e.g., Field Effect Transistor (FET) health issues, over-current conditions, over-voltage conditions, under-voltage conditions, over-temperature conditions, etc.) that could otherwise draw large currents that lead to computing system damage, power losses, and/or other fault issues known in the art, and thus the hot-swap controller 206a may be configurable to monitor faults associated with the component 208a, the hot-swap controller 206b may be configurable to monitor faults associated with the component 208b, and hot-swap controller 206c may be configurable to monitor faults associated with the component 208c.

The chassis 202 may also house a communication system 210 that is coupled to the hot-swap controller monitoring configuration engine 204a (e.g., via a coupling between the communication system 210 and the remote access controller processing system) and that may be provided by a Network Interface Controller (NIC), wireless communication systems (e.g., BLUETOOTH®, Near Field Communication (NFC) components, WiFi components, etc.), and/or any other communication components that would be apparent to one of skill in the art in possession of the present disclosure. However, while a specific computing system 200 has been illustrated and described, one of skill in the art in possession of the present disclosure will recognize that computing systems (or other devices operating according to the teachings of the present disclosure in a manner similar to that described below for the computing system 200) may include a variety of components and/or component configurations for providing conventional computing system functionality, as well as the functionality discussed below, while remaining within the scope of the present disclosure as well.

Referring now to FIGS. 3A, 3B, 3C, and 3D, an embodiment of hot-swap controller monitoring configuration data is illustrated that may be utilized in the hot-swap controller monitoring configuration system of the present disclosure. In the specific example illustrated in FIGS. 3A-3D, the hot-swap controller monitoring configuration data corresponds to available hot-swap controller monitoring configurations for an ADM1278® hot-swap controller available from ANALOG DEVICES, Inc. (ADI) of Norwood, Mass., United States, but one of skill in the art in possession of the present disclosure will appreciate how hot-swap controller monitoring configuration data for any of a variety of hot-swap controllers will fall within the scope of the present disclosure as well. As will be appreciated by one of skill in the art in possession of the present disclosure, the hot-swap controller monitoring configuration data illustrated in FIG. 3A identifies bits that may be set in a hot-swap controller register subsystem in order to set alert characteristics that define one or more alerts to generate in response to the monitoring of a component, and the hot-swap controller monitoring configuration data illustrated in FIGS. 3B-3D identify bits that may be set in a hot-swap controller register subsystem in order to set power monitoring characteristics that define how power consumption by a component will be monitored.

For example, FIG. 3A may provide an "ALERT 1 CONFIGURATION REGISTER" for the ADM1278® hot-swap controller discussed above, and illustrates how: bit 15 may be set in that register subsystem of the ADM1278® hot-swap controller to enable FET health fault monitoring/reporting, bit 14 may be set in that register subsystem of the ADM1278® hot-swap controller to enable $I_{OUT}$ over-current fault monitoring/reporting, bit 13 may be set in that register subsystem of the ADM1278® hot-swap controller to enable $V_{IN}$ over-current fault monitoring/reporting, bit 12 may be set in that register subsystem of the ADM1278® hot-swap controller to enable $V_{IN}$ under-voltage fault monitoring/reporting, bit 11 may be set in that register subsystem of the ADM1278® hot-swap controller to enable communications error monitoring/reporting, bit 10 may be set in that register subsystem of the ADM1278® hot-swap controller to enable $I_{OUT}$ over-current warning monitoring/reporting, bit 9 may be set in that register subsystem of the ADM1278® hot-swap controller to enable hysteretic output monitoring/reporting, bit 8 may be set in that register subsystem of the ADM1278® hot-swap controller to enable $V_{IN}$ over-voltage warning monitoring/reporting, bit 7 may be set in that register subsystem of the ADM1278® hot-swap controller to enable $V_{IN}$ under-voltage warning monitoring/reporting, bit 6 may be set in that register subsystem of the ADM1278® hot-swap controller to enable $V_{OUT}$ over-voltage warning monitoring/reporting, bit 5 may be set in that register subsystem of the ADM1278® hot-swap controller to enable $V_{OUT}$ under-voltage warning monitoring/reporting, bit 4 may be set in that register subsystem of the ADM1278® hot-swap controller to enable hot-swap in-limit monitoring/reporting, bit 3 may be set in that register subsystem of the ADM1278® hot-swap controller to enable pin over-power warning monitoring/reporting, bit 2 may be set in that register subsystem of the ADM1278® hot-swap controller to enable over-temperature fault monitoring/reporting, bit 1 may be set in that register subsystem of the ADM1278® hot-swap controller to enable over-temperature warning monitoring/reporting, and bit 0 may be reserved.

Similarly, FIGS. 3B-3D may provide a "POWER MONITOR CONFIGURATION REGISTER" for the ADM1278® hot-swap controller discussed above, and illustrates how: bit 15 may be set in that register subsystem of the ADM1278® hot-swap controller to disable (0) or enable (1) a temperature sensor filter, bit 14 may be set in that register subsystem of the ADM1278® hot-swap controller to disable (0) or enable (1) simultaneous sampling, bits 13:11 may be set in that register subsystem of the ADM1278® hot-swap controller to disable (000) or set (001, 010, 011, 100, 101, 110, or 111) sample averaging for power, bits 10:8 may be set in that register subsystem of the ADM1278® hot-swap controller to disable (000) or set (001, 010, 011, 100, 101, 110, or 111) sample averaging for current and voltage, bits 7:5 may be reserved, bit 4 may be set in that register subsystem of the ADM1278® hot-swap controller to set (0 or 1) a conversion mode for single shot sampling or continuous sampling, bit 3 may be set in that register subsystem of the ADM1278® hot-swap controller to disable (0) or enable (1) temperature sampling, bit 2 may be set in that register subsystem of the ADM1278® hot-swap controller to disable (0) or enable (1) $V_{IN}$ sampling, bit 1 may be set in that register subsystem of the ADM1278® hot-swap controller to disable (0) or enable (1) $V_{OUT}$ sampling, and bit 0 may be reserved.

Figure 4:
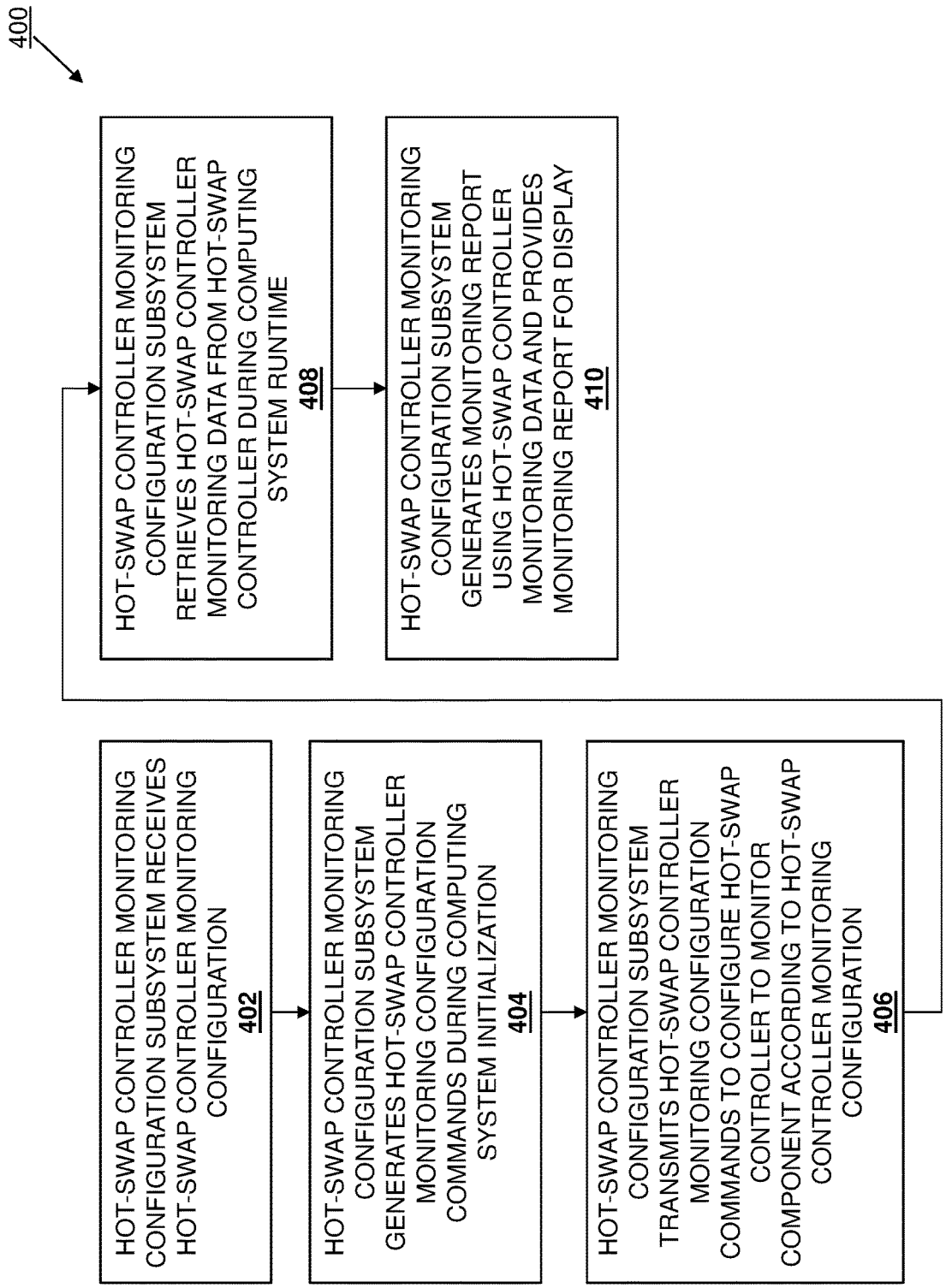
FIG. 4 is a flow chart illustrating an embodiment of a method for configuring monitoring for a hot-swap controller.

Referring now to FIG. 4, an embodiment of a method 400 for configuring monitoring for a hot-swap controller is illustrated. As discussed below, the systems and methods of the present disclosure allow an administrator or other user of a computing system to configure a hot-swap controller to monitor its component(s) for any monitoring characteristics of interest. For example, computing systems provided according to the teachings of the present disclosure may include a component, a hot-swap controller that is coupled to the component, and a hot-swap controller monitoring configuration subsystem that is coupled to the hot-swap controller. The hot-swap controller monitoring subsystem receives a hot-swap controller monitoring configuration for the hot-swap controller that defines at least one monitoring characteristic for monitoring the component, uses it during an initialization of the computing system to generate hot-swap controller monitoring configuration commands, and transmits the hot-swap controller monitoring configuration commands to the hot-swap controller to configure the hot-swap controller to monitor the component according to at least one monitoring characteristic defined by the hot-swap controller monitoring configuration. During a runtime of the computing system following the initialization of the computing system, the hot-swap controller monitoring subsystem retrieves hot-swap controller monitoring data generated by the hot-swap controller for the component according to at least one monitoring characteristic. As such, the administrator or other user of the computing system may configure hot-swap controllers to perform granular fault condition event monitoring/reporting on components/component faults that are of the highest concern to them, eliminating issues with conventional computing systems that would otherwise require their hot-swap controllers to be hard-coded to monitor for faults that are relevant to the largest subset of administrators/users of those conventional computing system platforms.

Figure 5A:
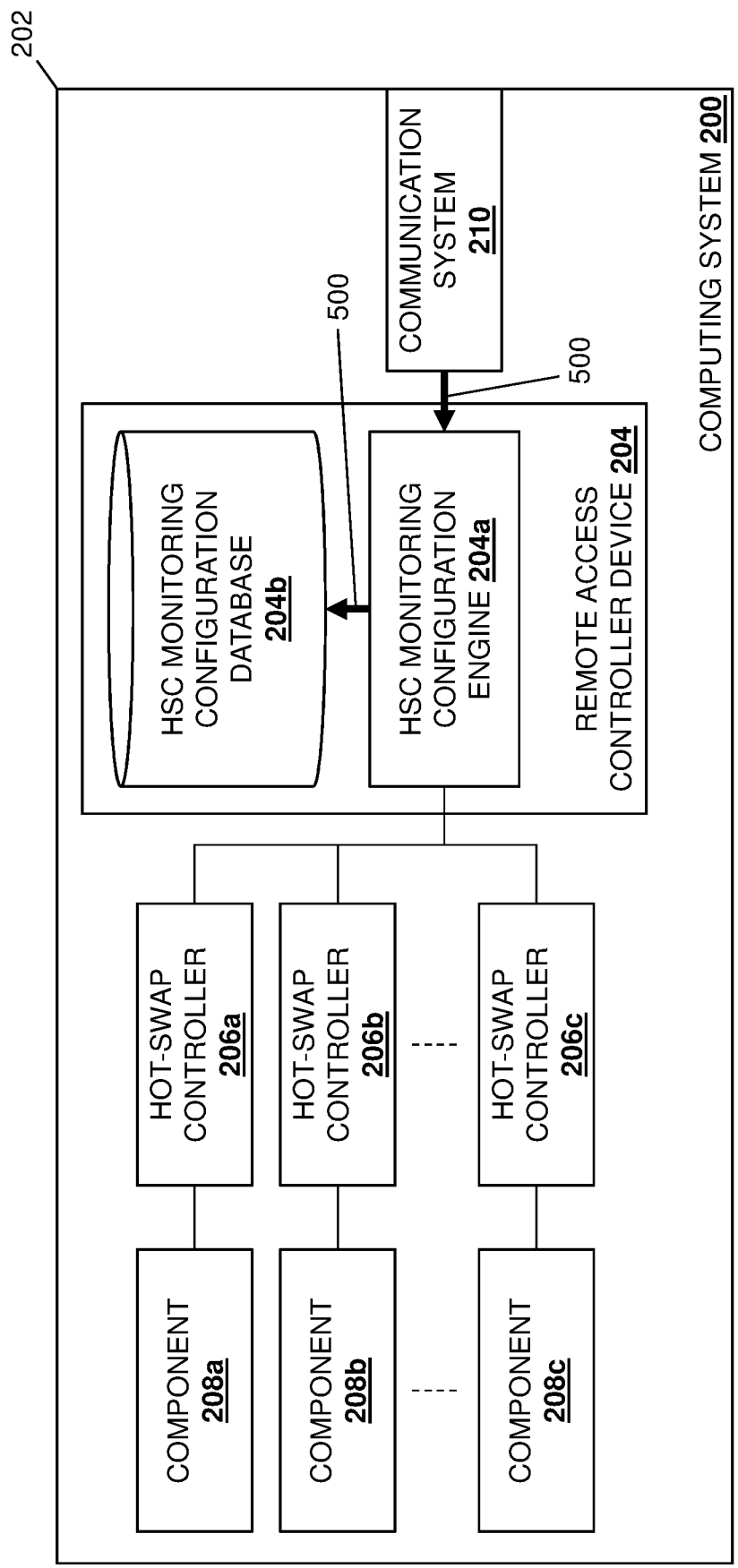
FIG. 5A is a schematic view illustrating an embodiment of the computing system of FIG. 2 operating during the method of FIG. 4.

The method 400 begins at block 402 where a hot-swap controller monitoring configuration subsystem receives a hot-swap controller monitoring configuration. With reference to FIG. 5A, in an embodiment of block 402, the hot-swap controller monitoring configuration engine 204a in the remote access controller device 204 of the computing system 200 may perform hot-swap controller monitoring configuration receiving operations 500 that may include receiving hot-swap controller monitoring configuration(s) for any of the hot-swap controllers 206a-206c via the communication system 210, and storing those hot-swap controller monitoring configuration(s) in the hot-swap controller monitoring configuration database 204b.

For example, the computing system 200 and/or a computing device coupled thereto may enable an administrator or other user of the computing system 200 to provide the hot-swap controller monitoring configuration (e.g., via a Graphical User Interface (GUI), a Command Line Interface (CLI), etc.) that defines one or more monitoring characteristics for a hot-swap controller to define how that hot-swap controller should monitor its corresponding component(s). In some embodiments, the hot-swap controller monitoring configuration engine 204a may perform hot-swap controller monitoring configuration receiving operations 500 during a first runtime of the computing system 200 (e.g., when an operating system in the computing system 200 is controlling the operations of the computing system 200). However, while the hot-swap controller monitoring configuration is illustrated and described as being received via the communication system 210 in the computing system 200 (e.g., via a network) during a particular operating state of the computing system 200, one of skill in the art in possession of the present disclosure will appreciate how the hot-swap controller monitoring configuration may be received via an input device included in and/or connected to the computing system 200 during any operating systems of the computing system 200, and/or in any other manner known in the art.

As such, the hot-swap controller monitoring configuration(s) received at block 402 may provide one or more monitoring characteristics for the hot-swap controller 206a to define how that hot-swap controller 206a should monitor its corresponding component 208a, one or more monitoring characteristics for the hot-swap controller 206b to define how that hot-swap controller 206b should monitor its corresponding component 208b, and/or one or more monitoring characteristics for the hot-swap controller 206c to define how that hot-swap controller 206c should monitor its corresponding component 208c.

In a specific example, the hot-swap controller monitoring configuration may be provided by the administrator or other user of the computing system 200 via a telemetry data metric definition that identifies monitoring characteristics such as alert characteristics that define one or more alerts (e.g., types of alerts) to generate in response to the monitoring of the component, one or more power monitoring characteristics that define how power consumption by the component will be monitored, any thresholds associate with the alert(s) or power monitoring, as well as any other monitoring characteristics that would be apparent to one of skill in the art in possession of the present disclosure. As such, with reference to the "ALERT 1 CONFIGURATION REGISTER" for the ADM1278® hot-swap controller discussed above with reference to FIG. 3A, the alert characteristics included in the hot-swap controller monitoring configuration received at block 402 may identify any of the alert monitoring/reporting associated with bits 1-15 in the "ALERT 1 CONFIGURATION REGISTER" for the ADM1278® hot-swap controller, as well as any thresholds required by that alert monitoring/reporting. Similarly, with reference to the "POWER MONITOR CONFIGURATION REGISTER" for the ADM1278® hot-swap controller discussed above with reference to FIGS. 3B-3D, the power monitoring characteristics included in the hot-swap controller monitoring configuration received at block 402 may identify any of the power monitoring/reporting associated with bits 1-4 and 8-15 in the "ALERT 1 CONFIGURATION REGISTER" for the ADM1278® hot-swap controller, as well as any thresholds required by that power monitoring/reporting.

As such, the alert characteristics received at block 402 may enable or disable any of: the FET health fault monitoring/reporting associated with bit 15 in the "ALERT 1 CONFIGURATION REGISTER" for the ADM1278® hot-swap controller, the $I_{OUT}$ over-current fault monitoring/reporting associated with bit 14 in the "ALERT 1 CONFIGURATION REGISTER" for the ADM1278® hot-swap controller, the $V_{IN}$ over-current fault monitoring/reporting associated with bit 13 in the "ALERT 1 CONFIGURATION REGISTER" for the ADM1278® hot-swap controller, the $V_{IN}$ under-voltage fault monitoring/reporting associated with bit 12 in the "ALERT 1 CONFIGURATION REGISTER" for the ADM1278® hot-swap controller, the communications error monitoring/reporting associated with bit 11 in the "ALERT 1 CONFIGURATION REGISTER" for the ADM1278® hot-swap controller, the $I_{OUT}$ over-current warning monitoring/reporting associated with bit 10 in the "ALERT 1 CONFIGURATION REGISTER" for the ADM1278® hot-swap controller, the hysteretic output monitoring/reporting associated with bit 9 in the "ALERT 1 CONFIGURATION REGISTER" for the ADM1278® hot-swap controller, the $V_{IN}$ over-voltage warning monitoring/reporting associated with bit 8 in the "ALERT 1 CONFIGURATION REGISTER" for the ADM1278® hot-swap controller, the $V_{IN}$ under-voltage warning monitoring/reporting associated with bit 7 in the "ALERT 1 CONFIGURATION REGISTER" for the ADM1278® hot-swap controller, the $V_{OUT}$ over-voltage warning monitoring/reporting associated with bit 6 in the "ALERT 1 CONFIGURATION REGISTER" for the ADM1278® hot-swap controller, the $V_{OUT}$ under-voltage warning monitoring/reporting associated with bit 5 in the "ALERT 1 CONFIGURATION REGISTER" for the ADM1278® hot-swap controller, the hot-swap in-limit monitoring/reporting associated with bit 4 in the "ALERT 1 CONFIGURATION REGISTER" for the ADM1278® hot-swap controller, the pin over-power warning monitoring/reporting associated with bit 3 in the "ALERT 1 CONFIGURATION REGISTER" for the ADM1278® hot-swap controller, the over-temperature fault monitoring/reporting associated with bit 2 in the "ALERT 1 CONFIGURATION REGISTER" for the ADM1278® hot-swap controller, and/or the over-temperature warning monitoring/reporting associated with bit 1 in the "ALERT 1 CONFIGURATION REGISTER" for the ADM1278® hot-swap controller.

Similarly, the power monitoring characteristics received at block 402 enable or disable any of: the temperature sensor filter associated with bit 15 in the "POWER MONITOR CONFIGURATION REGISTER" for the ADM1278® hot-swap controller, the simultaneous sampling associated with bit 14 in the "POWER MONITOR CONFIGURATION REGISTER" for the ADM1278® hot-swap controller, the temperature sampling associated with bit 3 in the "POWER MONITOR CONFIGURATION REGISTER" for the ADM1278® hot-swap controller, the $V_{IN}$ sampling associated with bit 2 in the "POWER MONITOR CONFIGURATION REGISTER" for the ADM1278® hot-swap controller, and/or the $V_{OUT}$ sampling associated with bit 1 in the "POWER MONITOR CONFIGURATION REGISTER" for the ADM1278® hot-swap controller. The power monitoring characteristics received at block 402 may also disable or set the sample averaging for power associated with bits 13:11 in the "POWER MONITOR CONFIGURATION REGISTER" for the ADM1278® hot-swap controller, disable or set the sample averaging for current and voltage associated with bit 10:8 in the "POWER MONITOR CONFIGURATION REGISTER" for the ADM1278® hot-swap controller, and/or set the conversion mode for single shot sampling or continuous sampling associated with bit 4 in the "POWER MONITOR CONFIGURATION REGISTER" for the ADM1278® hot-swap controller.

However, while a specific hot-swap controller monitoring configuration that provides for the configuration of alert characteristics and power monitoring characteristics using an "ALERT 1 CONFIGURATION REGISTER" and a "POWER MONITOR CONFIGURATION REGISTER" for the ADM1278® hot-swap controller has been illustrated and described, one of skill in the art in possession of the present disclosure will appreciate how other hot-swap controllers may be capable of monitoring a variety of other monitoring characteristics known in the art, and that the teachings of the present disclosure may be utilized to configure those hot-swap controllers to perform monitoring operations of any of those monitoring characteristics while remaining within the scope of the present disclosure as well. As such, an administrator or other user of the computing system 200 that wishes to have the hot-swap controllers 206a-206c monitor and report particular telemetry data associated with particular faults, warning, and/or other monitoring/reporting operations may generate a telemetry data metric definition that identifies the monitoring characteristics associated with those faults, warning, and/or other monitoring/reporting operations, and provide that telemetry data metric definition/hot-swap controller monitoring configuration to the hot-swap controller monitoring configuration engine 204a in the remote access controller device 204 of the computing system 200.

The method 400 then proceeds to block 404 where the hot-swap controller monitoring configuration subsystem generates hot-swap controller monitoring configuration commands during computing system initialization. In an embodiment, at block 404, the computing system 200 may be reset, rebooted, and/or otherwise initialized following the first runtime discussed above in which the hot-swap controller monitoring configuration was received. In some examples, the hot-swap controller monitoring configuration engine 204a in the remote access controller device 204 of the computing system 200 may cause the initialization of the computing system 200 following the receiving and storing of the hot-swap controller monitoring configuration at block 402. However, in other examples, the hot-swap controller monitoring configuration engine 204a in the remote access controller device 204 of the computing system 200 may wait for the initialization of the computing system 200 (e.g., by an administrator or other user of the computing system 200) following the receiving and storing of the hot-swap controller monitoring configuration at block 402.

Figure 5B:
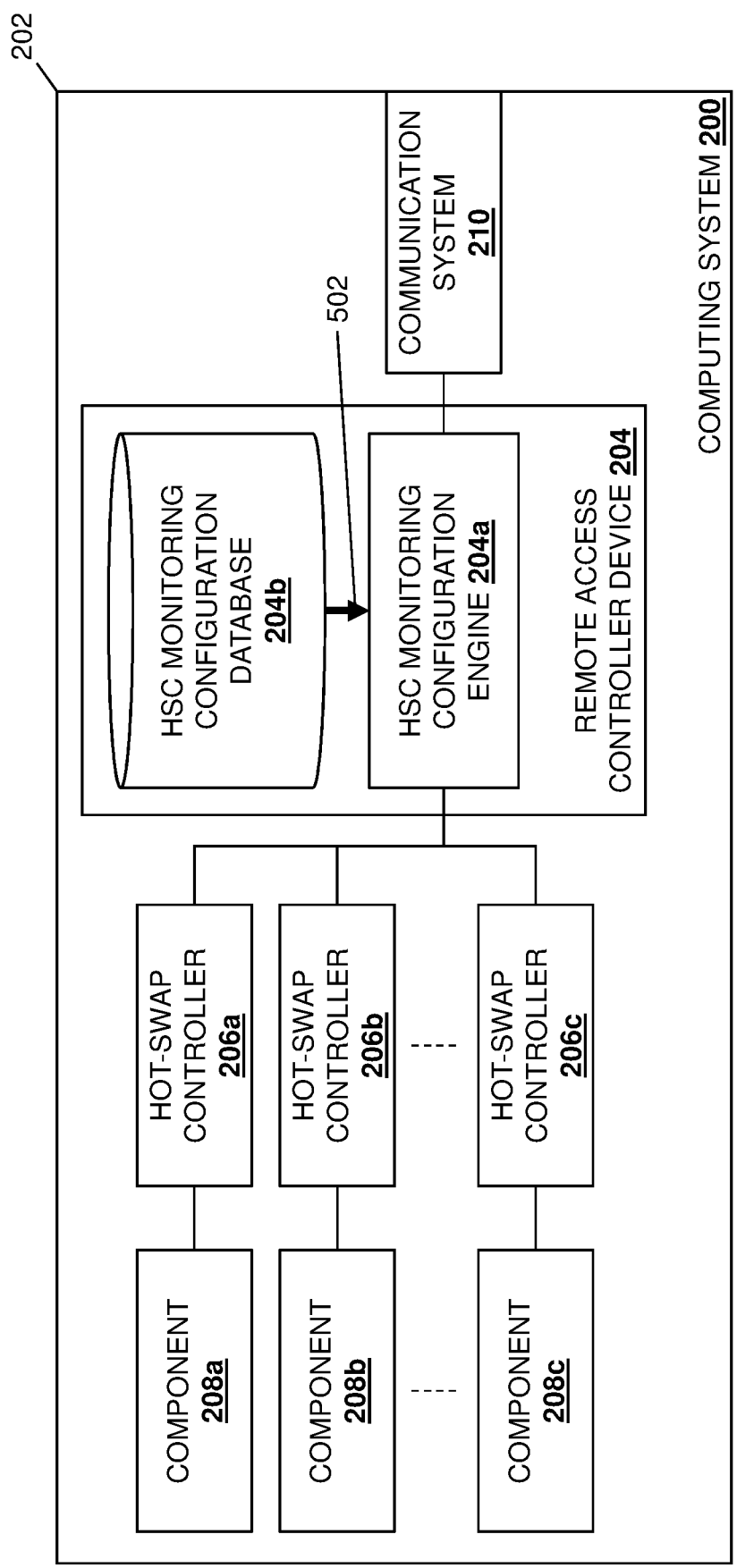
FIG. 5B is a schematic view illustrating an embodiment of the computing system of FIG. 2 operating during the method of FIG. 4.

With reference to FIG. 5B, in an embodiment of block 404 and in response to the initialization of the computing system 200, the computing system 200 may perform hot-swap controller monitoring configuration command generation operations 502 that may include retrieving the hot-swap controller monitoring configuration(s) from the hot-swap controller monitoring configuration database 204b, and then using the hot-swap controller monitoring configuration(s) to generate respective hot-swap controller monitoring configuration commands, In a specific example, the hot-swap controller monitoring configuration command(s) may be I2C commands, although one of skill in the art in possession of the present disclosure will appreciate how other types of commands may be utilized for the hot-swap controller monitoring configuration command(s) while remaining within the scope of the present disclosure as well.

As such, the hot-swap controller monitoring configuration command(s) generated for any hot-swap controller at block 404 may be I2C commands that are configured to set any of: bit 15 in the "ALERT 1 CONFIGURATION REGISTER" for the ADM1278® hot-swap controller associated with FET health fault monitoring/reporting, bit 14 in the "ALERT 1 CONFIGURATION REGISTER" for the ADM1278® hot-swap controller associated with $I_{OUT}$ over-current fault monitoring/reporting, bit 13 in the "ALERT 1 CONFIGURATION REGISTER" for the ADM1278® hot-swap controller associated with $V_{IN}$ over-current fault monitoring/reporting, bit 12 in the "ALERT 1 CONFIGURATION REGISTER" for the ADM1278® hot-swap controller associated with $V_{IN}$ under-voltage fault monitoring/reporting, bit 11 in the "ALERT 1 CONFIGURATION REGISTER" for the ADM1278® hot-swap controller associated with communications error monitoring/reporting, bit 10 in the "ALERT 1 CONFIGURATION REGISTER" for the ADM1278® hot-swap controller associated with $I_{OUT}$ over-current warning monitoring/reporting, bit 9 in the "ALERT 1 CONFIGURATION REGISTER" for the ADM1278® hot-swap controller associated with hysteretic output monitoring/reporting, bit 8 in the "ALERT 1 CONFIGURATION REGISTER" for the ADM1278® hot-swap controller associated with $V_{IN}$ over-voltage warning monitoring/reporting, bit 7 in the "ALERT 1 CONFIGURATION REGISTER" for the ADM1278® hot-swap controller associated with $V_{IN}$ under-voltage warning monitoring/reporting, bit 6 in the "ALERT 1 CONFIGURATION REGISTER" for the ADM1278® hot-swap controller associated with $V_{OUT}$ over-voltage warning monitoring/reporting, bit 5 in the "ALERT 1 CONFIGURATION REGISTER" for the ADM1278® hot-swap controller associated with $V_{OUT}$ under-voltage warning monitoring/reporting, bit 4 in the "ALERT 1 CONFIGURATION REGISTER" for the ADM1278® hot-swap controller associated with hot-swap in-limit monitoring/reporting, bit 3 in the "ALERT 1 CONFIGURATION REGISTER" for the ADM1278® hot-swap controller associated with pin over-power warning monitoring/reporting, bit 2 in the "ALERT 1 CONFIGURATION REGISTER" for the ADM1278® hot-swap controller associated with over-temperature fault monitoring/reporting, and/or bit 1 in the "ALERT 1 CONFIGURATION REGISTER" for the ADM1278® hot-swap controller associated with over-temperature warning monitoring/reporting.

Similarly, the hot-swap controller monitoring configuration command(s) generated for any hot-swap controller at block 404 may be I2C commands that are configured to enable or disable any of: bit 15 in the "POWER MONITOR CONFIGURATION REGISTER" for the ADM1278® hot-swap controller associated with the temperature sensor filter, bit 14 in the "POWER MONITOR CONFIGURATION REGISTER" for the ADM1278® hot-swap controller associated with simultaneous sampling, bit 3 in the "POWER MONITOR CONFIGURATION REGISTER" for the ADM1278® hot-swap controller associated with temperature sampling, bit 2 in the "POWER MONITOR CONFIGURATION REGISTER" for the ADM1278® hot-swap controller associated with $V_{IN}$ sampling, and/or bit 1 in the "POWER MONITOR CONFIGURATION REGISTER" for the ADM1278® hot-swap controller associated with $V_{OUT}$ sampling. The hot-swap controller monitoring configuration command(s) generated for any hot-swap controller at block 404 may also be I2C commands that are configured to disable or set bits 13:11 in the "POWER MONITOR CONFIGURATION REGISTER" for the ADM1278® hot-swap controller associated with sample averaging for power, disable or set bits 10:8 in the "POWER MONITOR CONFIGURATION REGISTER" for the ADM1278® hot-swap controller associated with the sample averaging for current and voltage, and/or set bit 4 in the "POWER MONITOR CONFIGURATION REGISTER" for the ADM1278® hot-swap controller associated with conversion mode for single shot sampling or continuous sampling. While not discussed in detail below, hot-swap controller monitoring configuration command(s) generated for any hot-swap controller at block 404 may be I2C commands that also define any threshold limits required for the alert characteristics or power monitoring characteristics discussed above.

Figure 5C:
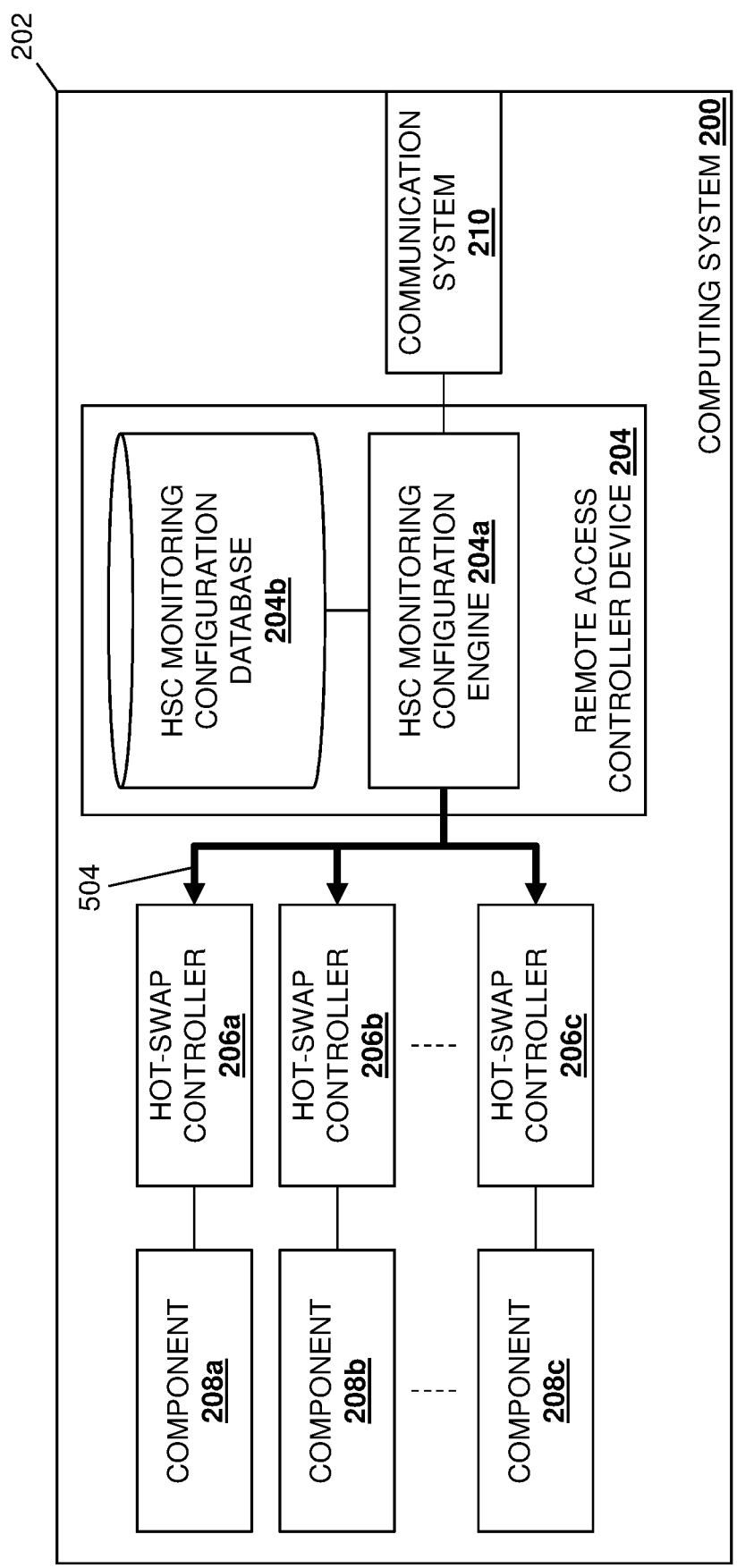
FIG. 5C is a schematic view illustrating an embodiment of the computing system of FIG. 2 operating during the method of FIG. 4.

The method 400 then proceeds to block 406 where the hot-swap controller monitoring configuration subsystem transmits the hot-swap controller monitoring configuration commands to configure the hot-swap controller to monitor a component according to the hot-swap controller monitoring configuration. With reference to FIG. 5C, in an embodiment of block 406, the hot-swap controller monitoring configuration engine 204a in the remote access controller device 204 of the computing system 200 may perform hot-swap controller monitoring configuration command transmission operations 504 that may include transmitting the hot-swap controller monitoring configuration command(s) generated at block 406 to any of the hot-swap controllers 206a-206c for which those hot-swap controller monitoring configuration command(s) were generated. As such, continuing with the specific example provided above, the hot-swap controller monitoring configuration command transmission operations 504 that may include the hot-swap controller monitoring configuration engine 204a in the remote access controller device 204 of the computing system 200 transmitting the I2C commands generated at block 406 via an I2C bus to any of the hot-swap controllers 206a-206c for which those I2C command(s) were generated. As will be appreciated by one of skill in the art in possession of the present disclosure, the transmission of the hot-swap controller monitoring configuration command(s) (e.g., I2C commands) to any of the hot-swap controllers 206a-206c may provide for the setting of register subsystems in those hot-swap controllers 206a-206b based on the information included in the hot-swap controller monitoring configuration command(s).

As such, the transmission of the hot-swap controller monitoring configuration command(s) (e.g., I2C command(s)) at block 406 to any of the hot-swap controllers 206a-206c may cause the setting of: bit 15 in the "ALERT 1 CONFIGURATION REGISTER" for that ADM1278® hot-swap controller associated with FET health fault monitoring/reporting, bit 14 in the "ALERT 1 CONFIGURATION REGISTER" for that ADM1278® hot-swap controller associated with $I_{OUT}$ over-current fault monitoring/reporting, bit 13 in the "ALERT 1 CONFIGURATION REGISTER" for that ADM1278® hot-swap controller associated with $V_{IN}$ over-current fault monitoring/reporting, bit 12 in the "ALERT 1 CONFIGURATION REGISTER" for that ADM1278® hot-swap controller associated with $V_{IN}$ under-voltage fault monitoring/reporting, bit 11 in the "ALERT 1 CONFIGURATION REGISTER" for that ADM1278® hot-swap controller associated with communications error monitoring/reporting, bit 10 in the "ALERT 1 CONFIGURATION REGISTER" for that ADM1278® hot-swap controller associated with $I_{OUT}$ over-current warning monitoring/reporting, bit 9 in the "ALERT 1 CONFIGURATION REGISTER" for that ADM1278® hot-swap controller associated with hysteretic output monitoring/reporting, bit 8 in the "ALERT 1 CONFIGURATION REGISTER" for that ADM1278® hot-swap controller associated with $V_{IN}$ over-voltage warning monitoring/reporting, bit 7 in the "ALERT 1 CONFIGURATION REGISTER" for that ADM1278® hot-swap controller associated with $V_{IN}$ under-voltage warning monitoring/reporting, bit 6 in the "ALERT 1 CONFIGURATION REGISTER" for that ADM1278® hot-swap controller associated with $V_{OUT}$ over-voltage warning monitoring/reporting, bit 5 in the "ALERT 1 CONFIGURATION REGISTER" for that ADM1278® hot-swap controller associated with $V_{OUT}$ under-voltage warning monitoring/reporting, bit 4 in the "ALERT 1 CONFIGURATION REGISTER" for that ADM1278® hot-swap controller associated with hot-swap in-limit monitoring/reporting, bit 3 in the "ALERT 1 CONFIGURATION REGISTER" for that ADM1278® hot-swap controller associated with pin over-power warning monitoring/reporting, bit 2 in the "ALERT 1 CONFIGURATION REGISTER" for that ADM1278® hot-swap controller associated with over-temperature fault monitoring/reporting, and/or bit 1 in the "ALERT 1 CONFIGURATION REGISTER" for that ADM1278® hot-swap controller associated with over-temperature warning monitoring/reporting.

Similarly, the transmission of the hot-swap controller monitoring configuration command(s) (e.g., I2C command(s)) at block 406 to any of the hot-swap controllers 206a-206c may cause the setting of: bit 15 in the "POWER MONITOR CONFIGURATION REGISTER" for that ADM1278® hot-swap controller associated with the temperature sensor filter, bit 14 in the "POWER MONITOR CONFIGURATION REGISTER" for that ADM1278® hot-swap controller associated with simultaneous sampling, bit 3 in the "POWER MONITOR CONFIGURATION REGISTER" for that ADM1278® hot-swap controller associated with temperature sampling, bit 2 in the "POWER MONITOR CONFIGURATION REGISTER" for that ADM1278® hot-swap controller associated with $V_{IN}$ sampling, and/or bit 1 in the "POWER MONITOR CONFIGURATION REGISTER" for that ADM1278® hot-swap controller associated with $V_{OUT}$ sampling. The transmission of the hot-swap controller monitoring configuration command(s) (e.g., I2C command(s)) at block 406 to any of the hot-swap controllers 206a-206c may also cause the setting of: bits 13:11 in the "POWER MONITOR CONFIGURATION REGISTER" for that ADM1278® hot-swap controller associated with sample averaging for power, bits 10:8 in the "POWER MONITOR CONFIGURATION REGISTER" for that ADM1278® hot-swap controller associated with the sample averaging for current and voltage, and/or bit 4 in the "POWER MONITOR CONFIGURATION REGISTER" for that ADM1278® hot-swap controller associated with conversion mode for single shot sampling or continuous sampling. While not discussed in detail below, the transmission of the hot-swap controller monitoring configuration command(s) (e.g., I2C command(s)) at block 406 to any of the hot-swap controllers 206a-206c may cause the setting of any threshold limits required for the alert characteristics or power monitoring characteristics discussed above.

Figure 6A:
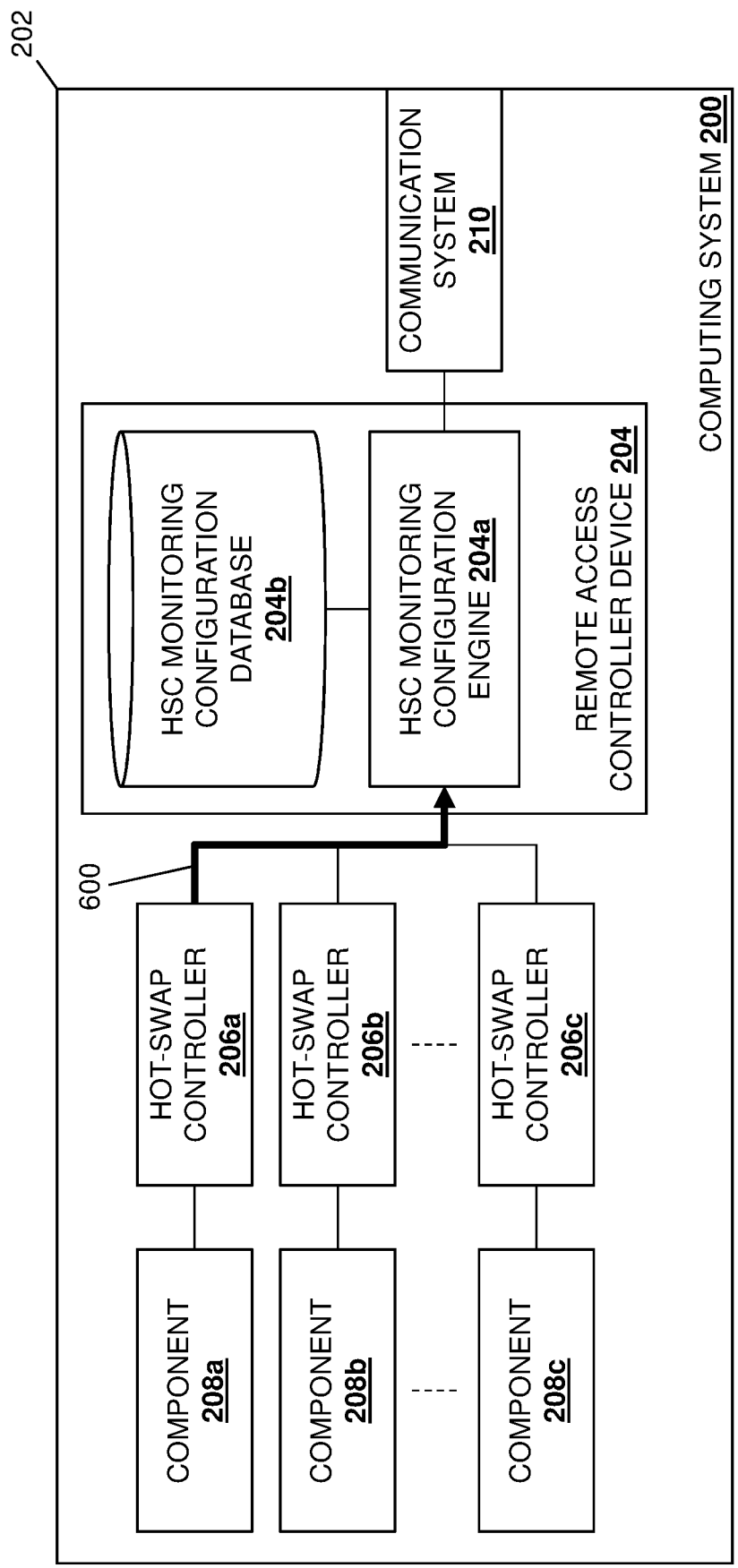
FIG. 6A is a schematic view illustrating an embodiment of the computing system of FIG. 2 operating during the method of FIG. 4.
Figure 6B:
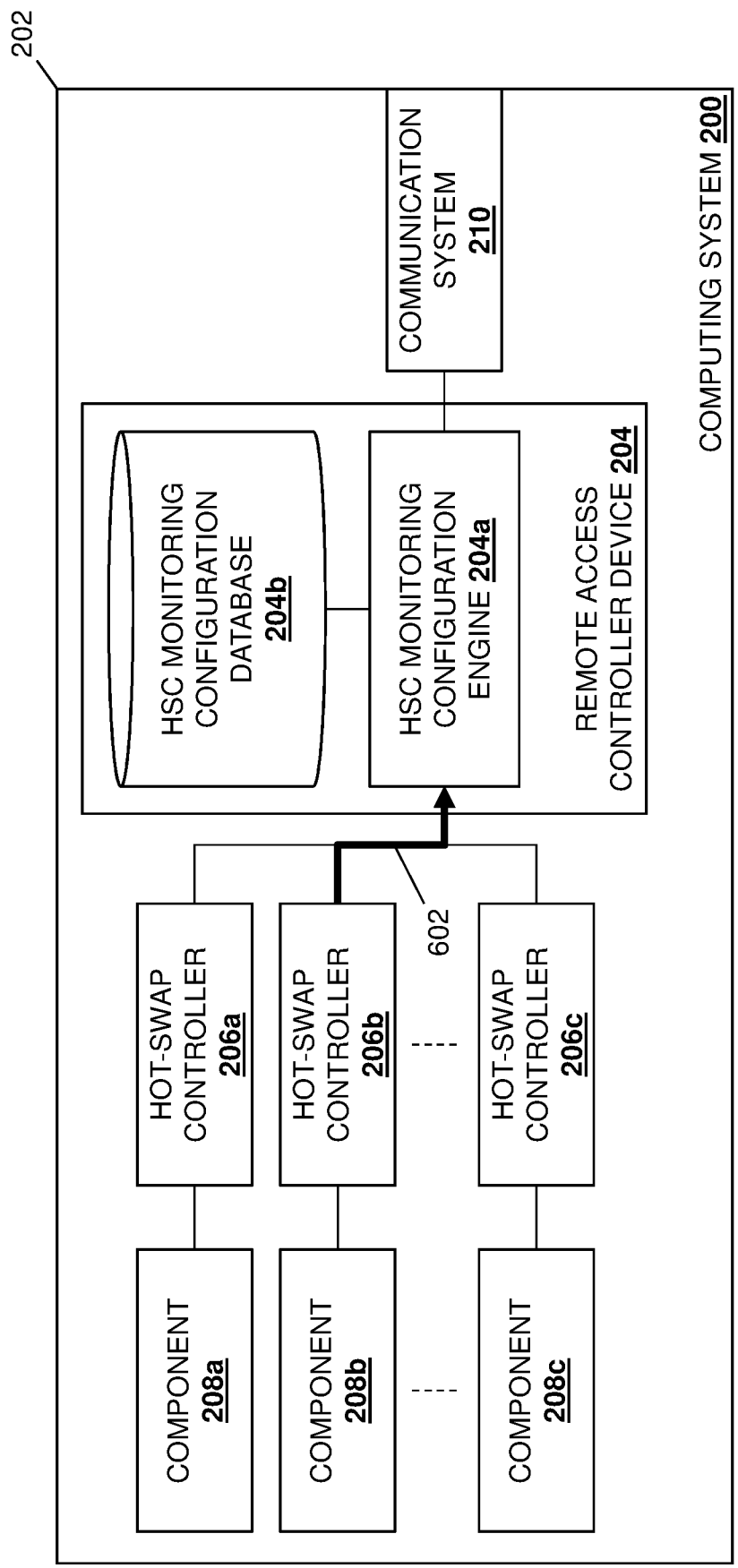
FIG. 6B is a schematic view illustrating an embodiment of the computing system of FIG. 2 operating during the method of FIG. 4.
Figure 6C:
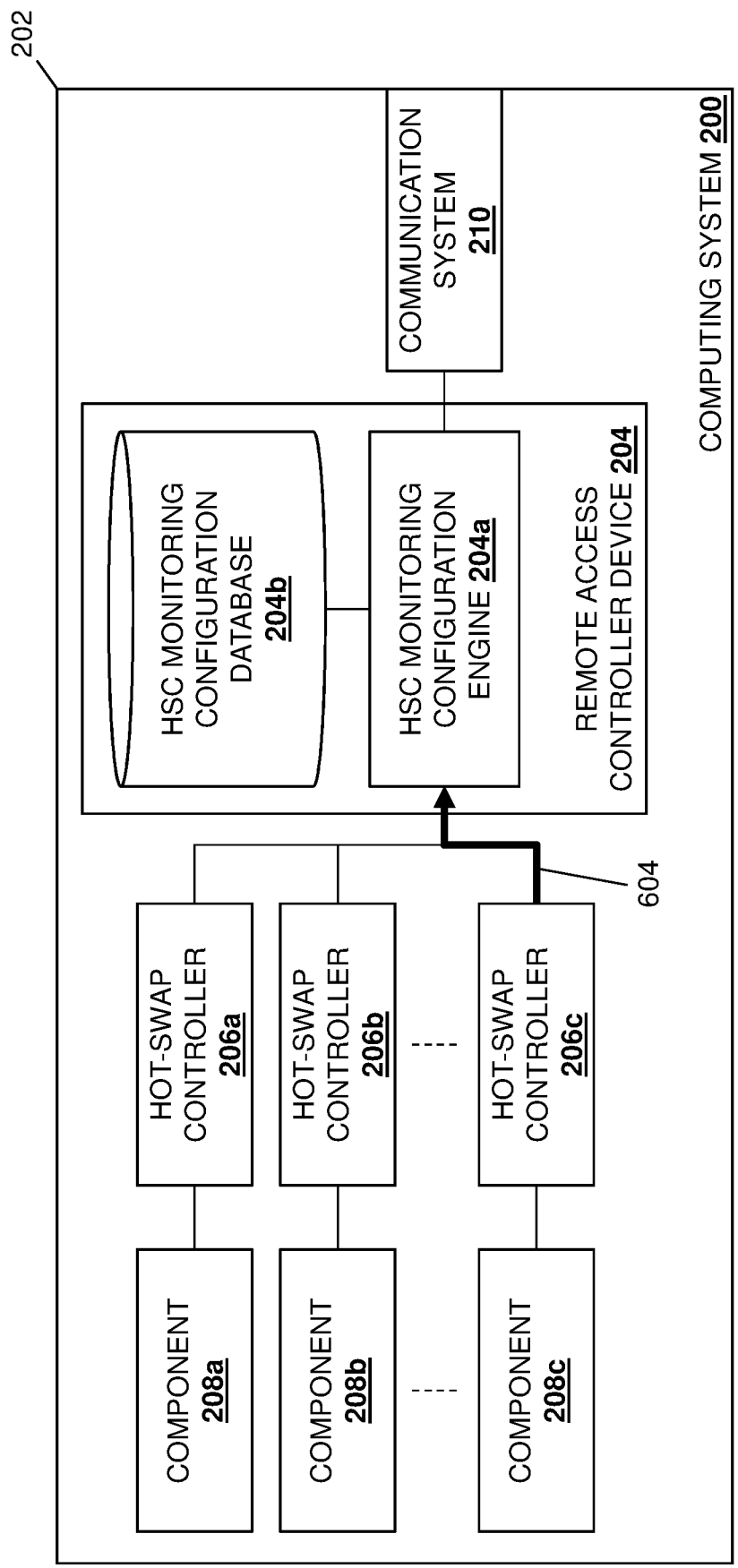
FIG. 6C is a schematic view illustrating an embodiment of the computing system of FIG. 2 operating during the method of FIG. 4.

The method 400 then proceeds to block 408 where the hot-swap controller monitoring configuration subsystem retrieves hot-swap controller monitoring data from the hot-swap controller during computing system runtime. With reference to FIGS. 6A, 6B, and 6C, in an embodiment of block 408, the hot-swap controller monitoring configuration engine 204a in the remote access controller device 204 of the computing system 200 may perform hot-swap controller monitoring data retrieval operations 600 that include retrieving hot-swap controller monitoring data from the hot-swap controller 206a, hot-swap controller monitoring data retrieval operations 602 that include retrieving hot-swap controller monitoring data from the hot-swap controller 206b, and hot-swap controller monitoring data retrieval operations 604 that include retrieving hot-swap controller monitoring data from the hot-swap controller 206c.

In a specific example, following the configuration of the hot-swap controllers 206a, 206b, and 206c at block 406 with the hot-swap controller monitoring configurations, the hot-swap controller 206a may operate to monitor its component 208a based on the monitoring characteristics provided by its hot-swap controller monitoring configuration, the hot-swap controller 206b may operate to monitor its component 208b based on the monitoring characteristics provided by its hot-swap controller monitoring configuration, and the hot-swap controller 206c may operate to monitor its component 208c based on the monitoring characteristics provided by its hot-swap controller monitoring configuration. As such, the hot-swap controllers 206a, 206b, and 206c may begin populating status registers in their respective register subsystems with hot-swap controller monitoring data based on their monitoring of the operation of the components 208a, 208b, and 208c, respectively. Continuing with the specific example provided above, at block 408 the hot-swap controllers 206a, 206b, and 206c may begin populating status registers in their respective register subsystems with alerts that depend on which of the FET health fault monitoring/reporting, the $I_{OUT}$ over-current fault monitoring/reporting, the $V_{IN}$ over-current fault monitoring/reporting, the $V_{IN}$ under-voltage fault monitoring/reporting, the communications error monitoring/reporting, the $I_{OUT}$ over-current warning monitoring/reporting, the hysteretic output monitoring/reporting, the $V_{IN}$ over-voltage warning monitoring/reporting, the $V_{IN}$ under-voltage warning monitoring/reporting, the $V_{OUT}$ over-voltage warning monitoring/reporting, the $V_{OUT}$ under-voltage warning monitoring/reporting, the hot-swap in-limit monitoring/reporting, the pin over-power warning monitoring/reporting, the over-temperature fault monitoring/reporting, and/or the over-temperature warning monitoring/reporting were enabled in the "ALERT 1 CONFIGURATION REGISTER" for that ADM1278® hot-swap controller discussed above.

Similarly, at block 408 the hot-swap controllers 206a, 206b, and 206c may begin populating status registers in their respective register subsystems based on the setting of the temperature sensor filter, simultaneous sampling, temperature sampling, $V_{IN}$ sampling, $V_{OUT}$ sampling, sample averaging for power, sample averaging for current and voltage, and/or conversion mode for single shot sampling or continuous sampling that were set in the "POWER MONITOR CONFIGURATION REGISTER" for that ADM1278® hot-swap controller discussed above. As such, the hot-swap controller monitoring data retrieval operations 600 performed by hot-swap controller monitoring configuration engine 204a in the remote access controller device 204 of the computing system 200 at block 408 may include the hot-swap controller monitoring configuration engine 204a accessing the register subsystems in the hot-swap controllers 206a, 206b, and 206c in order to retrieve the hot-swap controller monitoring data provided therein, which one of skill in the art in possession of the present disclosure will recognize may be performed in "real-time" or otherwise as those register subsystems are updated by the hot-swap controllers 206a, 206b, and 206c. However, while the hot-swap controller monitoring configuration engine 204a is described as retrieving the hot-swap controller monitoring data from register subsystems in the hot-swap controllers, one of skill in the art in possession of the present disclosure will appreciate how the hot-swap controllers may transmit their hot-swap controller monitoring data to the hot-swap controller monitoring configuration engine 204a while remaining within the scope of the present disclosure as well.

Figure 7:
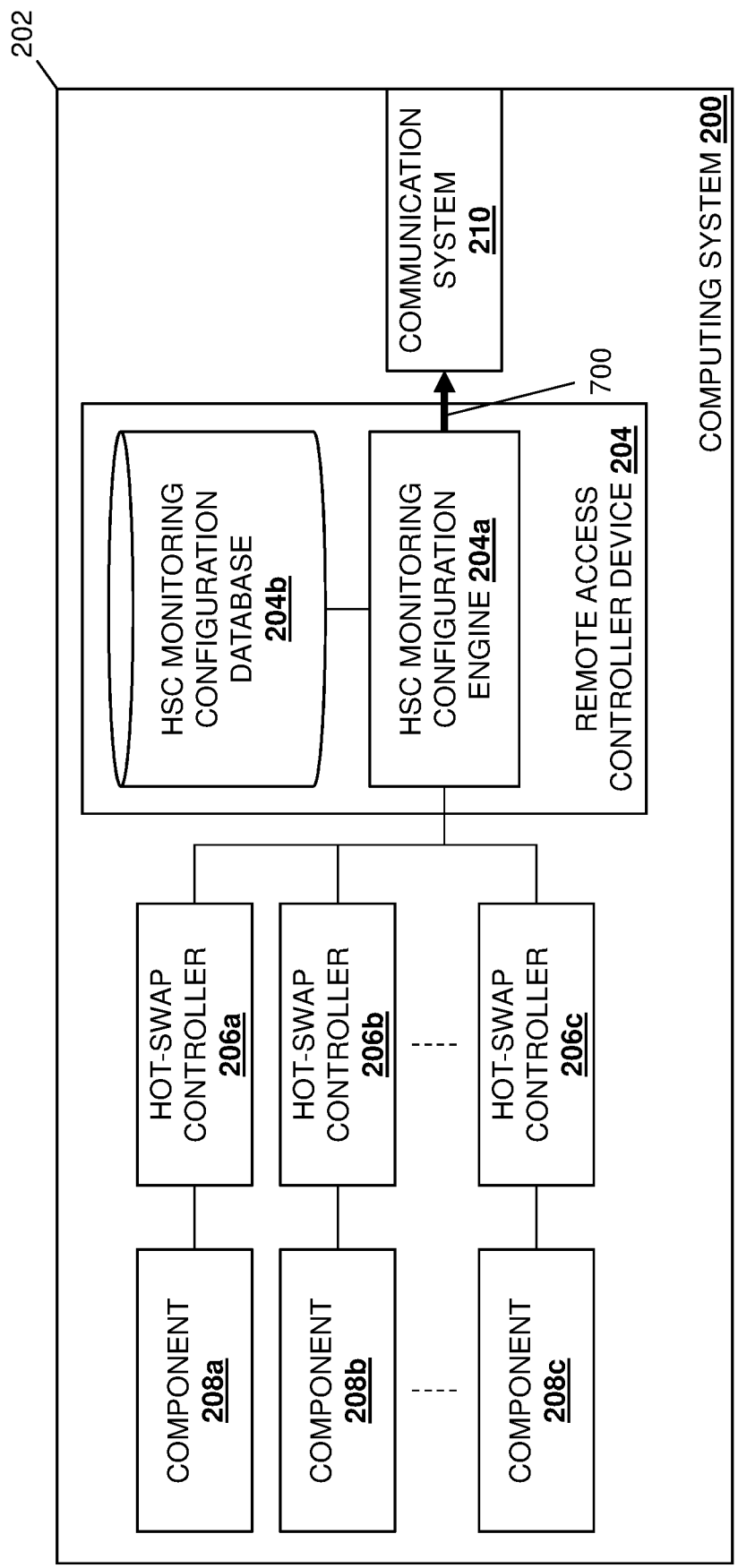
FIG. 7 is a schematic view illustrating an embodiment of the computing system of FIG. 2 operating during the method of FIG. 4.

The method 400 then proceeds to block 410 where the hot-swap controller monitoring configuration subsystem generates a monitoring report using the hot-swap controller monitoring data and provides the monitoring report for display. With reference to FIG. 7, in an embodiment of block 410, the hot-swap controller monitoring configuration engine 204a in the remote access controller device 204 of the computing system 200 may perform monitoring report provisioning operations 700 that include transmitting a monitoring report via the communication system 210, with that monitoring report configured to report the hot-swap controller monitoring data retrieved at block 408 by providing that monitoring data for display on a display device included with the management system that receives that monitoring report. As such, an administrator or other user of the computing system 200 may operate the management system to receive and view the hot-swap controller monitoring data included in the monitoring report.

Thus, systems and methods have been described that allow an administrator or other user of a server system to configure a hot-swap controller to monitor its component(s) for any faults of interest. For example, server systems provided according to the teachings of the present disclosure may include a component, a hot-swap controller that is coupled to the component, and a hot-swap controller monitoring configuration subsystem that is coupled to the hot-swap controller. The hot-swap controller monitoring subsystem receives a hot-swap controller monitoring configuration for the hot-swap controller that defines at least one fault that should be monitored for the component, uses it during an initialization of the server system to generate hot-swap controller monitoring configuration commands, and transmits the hot-swap controller monitoring configuration commands to the hot-swap controller to configure the hot-swap controller to monitor the component for the fault defined by the hot-swap controller monitoring configuration. During a runtime of the server system following the initialization of the server system, the hot-swap controller monitoring subsystem retrieves hot-swap controller monitoring data generated by the hot-swap controller for the component based on the fault. As such, the administrator or other user of the server system may configure hot-swap controllers to perform granular fault condition event monitoring/reporting on components/component faults that are of the highest concern to them, eliminating issues with conventional server systems that require their hot-swap controllers to be hard-coded to monitor for faults that are relevant to the largest subset of administrators/users.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A hot-swap monitoring configuration system, comprising:
   a computing system including a component;
   a hot-swap controller that is included in the computing system and that is coupled to the component;
   a hot-swap controller monitoring configuration subsystem that is included in the computing system and that is coupled to the hot-swap controller, wherein the hot-swap controller monitoring configuration subsystem is configured to:
      receive a hot-swap controller monitoring configuration for the hot-swap controller that defines at least one monitoring characteristic for monitoring the component;
      generate, using the host-swap controller monitoring configuration and during an initialization of the computing system, hot-swap controller monitoring configuration commands;
      transmit the hot-swap controller monitoring configuration commands to the hot-swap controller to configure the hot-swap controller to monitor the component according to at least one monitoring characteristic defined by the hot-swap controller monitoring configuration; and
      retrieve, during a runtime of the computing system following the initialization of the computing system, hot-swap controller monitoring data generated by the hot-swap controller for the component according to at least one monitoring characteristic.

2. The hot-swap monitoring configuration system of claim 1, further comprising:
   store, in response to receiving the hot-swap controller monitoring configuration, the hot-swap controller monitoring configuration in a persistent storage subsystem; and
   retrieve, in response to the initialization of the computing system, the hot-swap controller monitoring configuration from the persistent storage subsystem.

3. The hot-swap monitoring configuration system of claim 1, wherein the hot-swap controller monitoring configuration commands are Inter-Integrated Circuit (I2C) commands.

4. The hot-swap monitoring configuration system of claim 1, wherein the at least one monitoring characteristic defined by the hot-swap controller monitoring configuration includes an alert characteristic that defines one or more alerts to generate in response to the monitoring of the component, and a power monitoring characteristic that defines how power consumption by the component will be monitored.

5. The hot-swap monitoring configuration system of claim 1, wherein the retrieving the hot-swap controller monitoring data generated by the hot-swap controller for the component according to at least one monitoring characteristic includes reading status registers that are included in the hot-swap controller and that provide the hot-swap controller monitoring data.

6. The hot-swap monitoring configuration system of claim 1, wherein the hot-swap controller monitoring configuration subsystem is configured to:
   generate a monitoring report using the hot-swap controller monitoring data; and
   provide the monitoring report for display on a display device.

7. An Information Handling System (IHS), comprising:
   a processing system; and
   a memory system that is coupled to the processing system and that includes instructions that, when executed by the processing system, cause the processing system to provide a hot-swap controller monitoring engine that is configured to:
      receive a hot-swap controller monitoring configuration for a hot-swap controller that defines at least one monitoring characteristic for monitoring a component that is coupled to the hot-swap controller;
      generate, using the host-swap controller monitoring configuration and during initialization operations for a computing system that includes the hot-swap controller and the component, hot-swap controller monitoring configuration commands;
      transmit the hot-swap controller monitoring configuration commands to the hot-swap controller to configure the hot-swap controller to monitor the component according to at least one monitoring characteristic defined by the hot-swap controller monitoring configuration; and
      retrieve, during a runtime of the computing system following the initialization operations for the computing system, hot-swap controller monitoring data generated by the hot-swap controller for the component according to at least one monitoring characteristic.

8. The IHS of claim 7, wherein the hot-swap controller monitoring engine is configured to:
   store, in response to receiving the hot-swap controller monitoring configuration, the hot-swap controller monitoring configuration in a persistent storage subsystem; and
   retrieve, in response to the initialization operations for the computing system, the hot-swap controller monitoring configuration from the persistent storage subsystem.

9. The IHS of claim 7, wherein the hot-swap controller monitoring configuration commands are Inter-Integrated Circuit (I2C) commands.

10. The IHS of claim 7, wherein the at least one monitoring characteristic defined by the hot-swap controller monitoring configuration includes an alert characteristic that defines one or more alerts to generate in response to the monitoring of the component, and a power monitoring characteristic that defines how power consumption by the component will be monitored.

11. The IHS of claim 7, wherein the retrieving the hot-swap controller monitoring data generated by the hot-swap controller for the component according to at least one monitoring characteristic includes reading status registers that are included in the hot-swap controller and that provide the hot-swap controller monitoring data.

12. The IHS of claim 7, wherein the hot-swap controller monitoring engine is configured to:
   generate a monitoring report using the hot-swap controller monitoring data; and
   provide the monitoring report for display on a display device.

13. The IHS of claim 7, wherein the processing system and the memory system are provided in a remote access controller device that is included in the computing system.

14. A method for configuring monitoring by a hot-swap controller, comprising:
   receiving, by a hot-swap controller monitoring configuration subsystem, a hot-swap controller monitoring configuration for a hot-swap controller that defines at least one monitoring characteristic for monitoring a component that is coupled to the hot-swap controller;
   generating, by the hot-swap controller monitoring configuration subsystem using the host-swap controller monitoring configuration and during initialization operations for a computing system that includes the hot-swap controller and the component, hot-swap controller monitoring configuration commands;
   transmitting, by the hot-swap controller monitoring configuration subsystem, the hot-swap controller monitoring configuration commands to the hot-swap controller to configure the hot-swap controller to monitor the component according to at least one monitoring characteristic defined by the hot-swap controller monitoring configuration; and
   retrieving, by the hot-swap controller monitoring configuration subsystem during a runtime of the computing system following the initialization operations for the computing system, hot-swap controller monitoring data generated by the hot-swap controller for the component according to at least one monitoring characteristic.

15. The method of claim 14, further comprising:
   storing, by the hot-swap controller monitoring configuration subsystem in response to receiving the hot-swap controller monitoring configuration, the hot-swap controller monitoring configuration in a persistent storage subsystem; and
   retrieving, by the hot-swap controller monitoring configuration subsystem in response to the initialization operations for the computing system, the hot-swap controller monitoring configuration from the persistent storage subsystem.

16. The method of claim 14, wherein the hot-swap controller monitoring configuration commands are Inter-Integrated Circuit (I2C) commands.

17. The method of claim 14, wherein the at least one monitoring characteristic defined by the hot-swap controller monitoring configuration includes an alert characteristic that defines one or more alerts to generate in response to the monitoring of the component, and a power monitoring characteristic that defines how power consumption by the component will be monitored.

18. The method of claim 14, wherein the retrieving the hot-swap controller monitoring data generated by the hot-swap controller for the component according to at least one monitoring characteristic includes reading status registers that are included in the hot-swap controller and that provide the hot-swap controller monitoring data.

19. The method of claim 14, further comprising:
   generating, by the hot-swap controller monitoring configuration subsystem, a monitoring report using the hot-swap controller monitoring data; and
   providing, by the hot-swap controller monitoring configuration subsystem, the monitoring report for display on a display device.

20. The method of claim 14, wherein the hot-swap controller monitoring configuration subsystem is provided by a remote access controller device that is included in the computing system.

* * * * *